March 17, 1931.  C. E. NORTH  1,796,577
MILK HEATING APPARATUS
Filed July 27, 1928   3 Sheets-Sheet 1
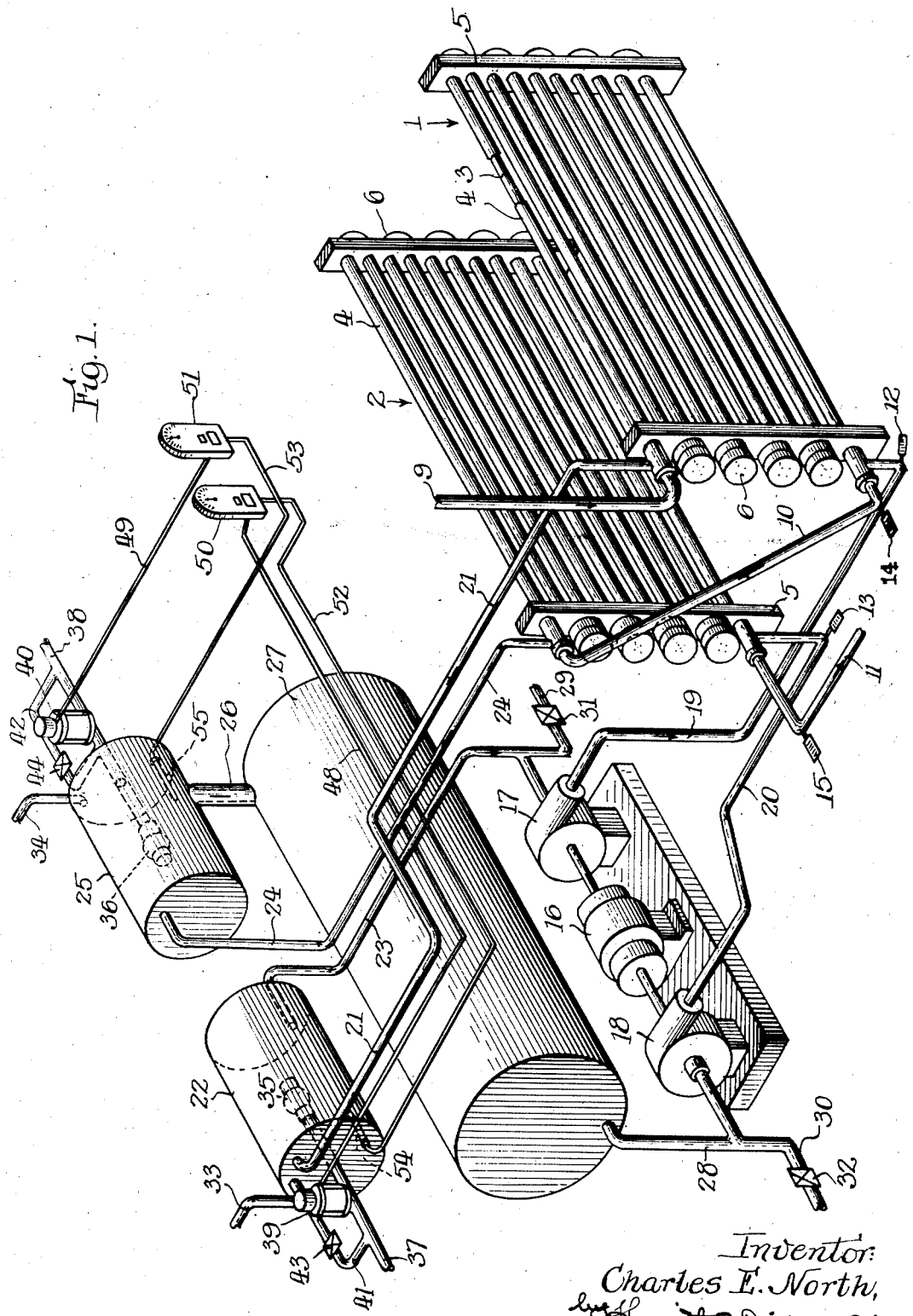

March 17, 1931.    C. E. NORTH    1,796,577
MILK HEATING APPARATUS
Filed July 27, 1928    3 Sheets-Sheet 2
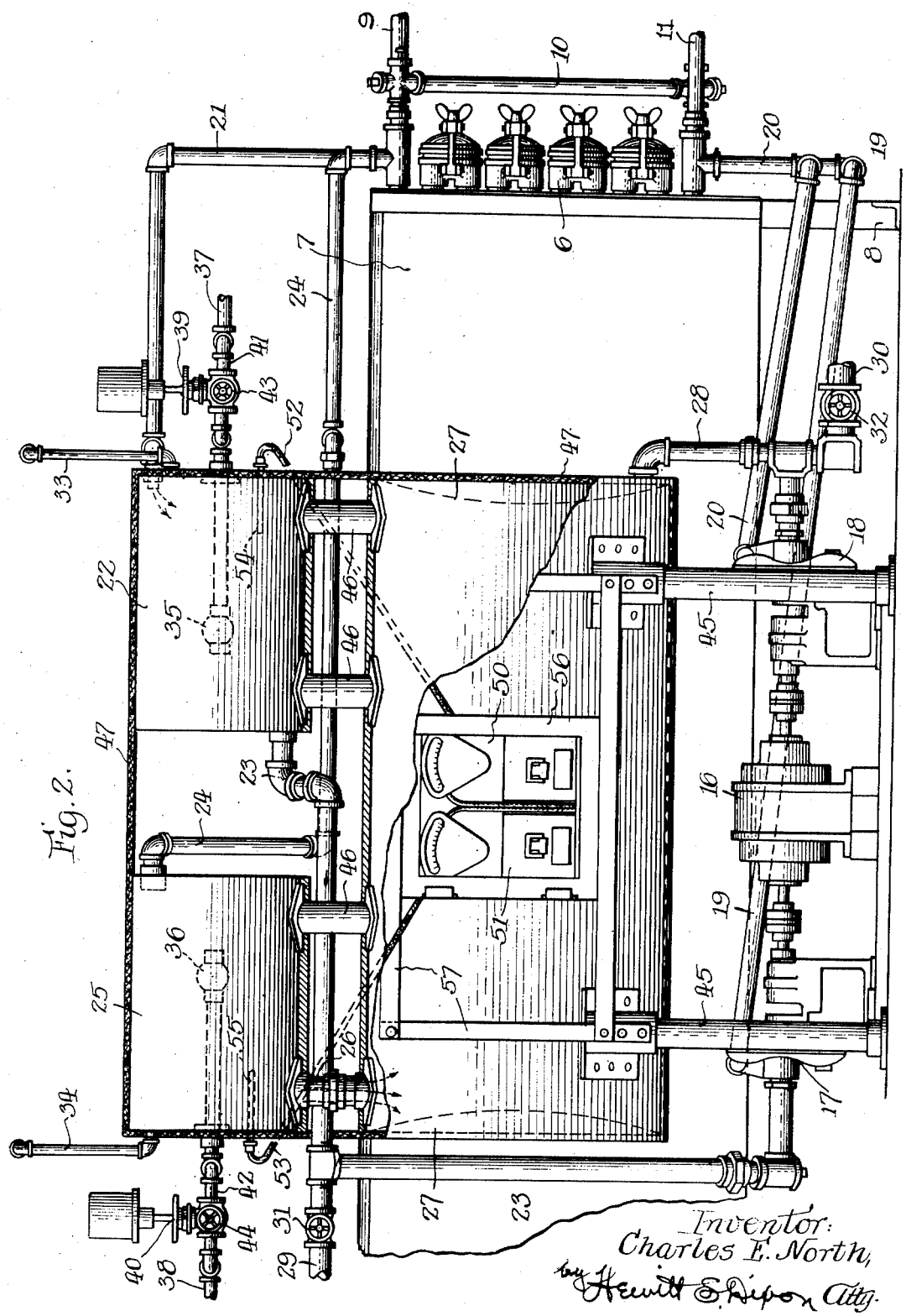
Inventor:
Charles E. North,
by Hewitt S. Dixon Atty.

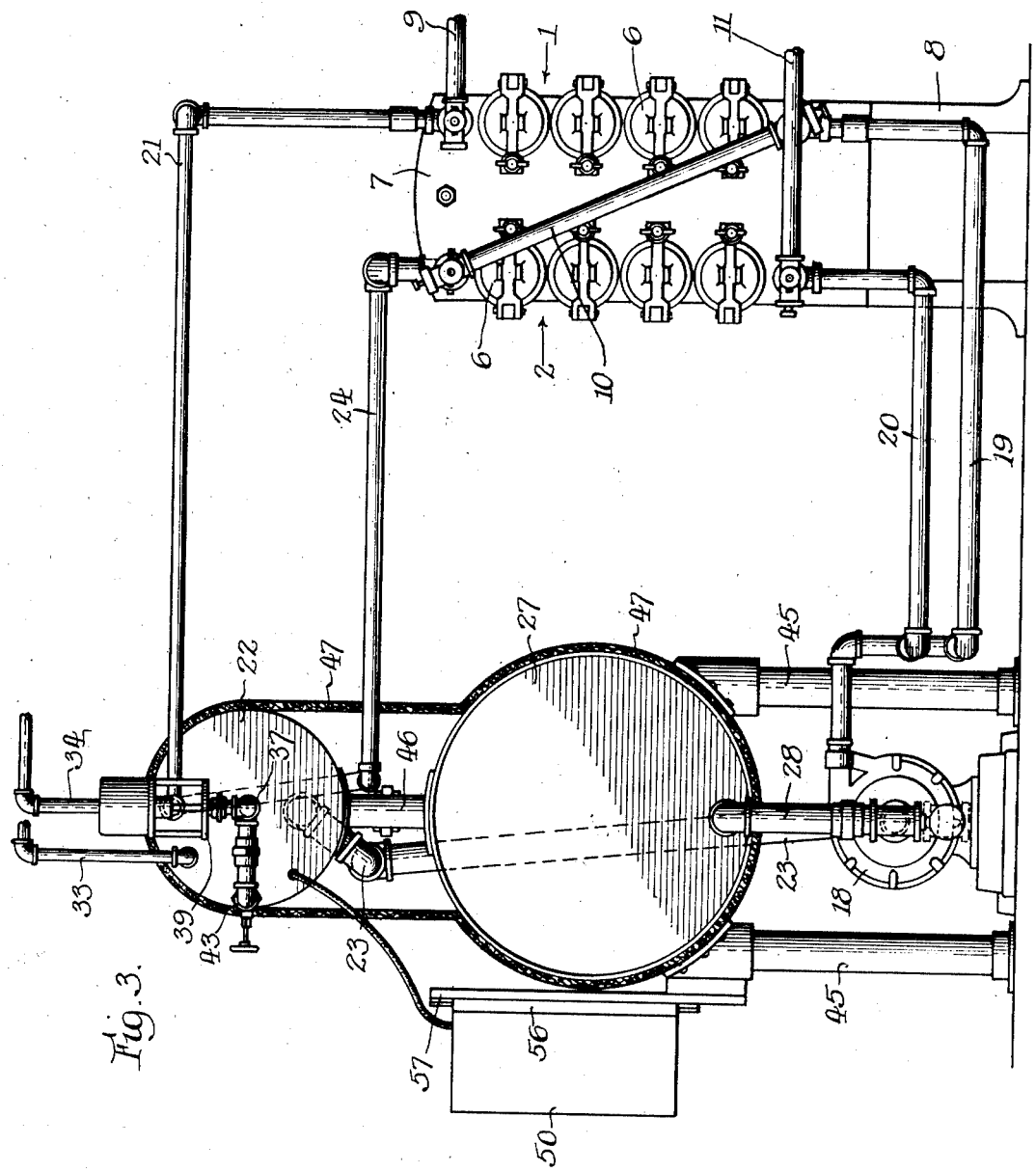

Patented Mar. 17, 1931

1,796,577

UNITED STATES PATENT OFFICE

CHARLES E. NORTH, OF MONTCLAIR, NEW JERSEY, ASSIGNOR TO THE CREAMERY PACKAGE MFG. COMPANY, OF CHICAGO, ILLINOIS, A CORPORATION OF ILLINOIS

MILK-HEATING APPARATUS

Application filed July 27, 1928. Serial No. 295,650.

The invention relates to flow type heaters used in the pasteurizing treatment of milk, and is more particularly related to apparatus of such type adapted for heating the milk to a predetermined degree of temperature.

The principal object of the invention is to provide milk heating apparatus operable to accomplish the automatic maintenance of a final temperature in the milk being heated, within limits of variation from the predetermined uniform final degree of temperature so narrow as to be without consequence to precise uniformity in qualitative effect upon the milk receiving the heat treatment.

Another object is to provide a flow type milk heater in which the milk stream is heated in successive stages by units having individual heating medium supply sources with separate temperature controls.

A further object is to provide means for restoring to the heating medium the heat given up in operation, with automatic maintenance of the effective temperature of the heating medium within limits reduced to a negligible factor of variation.

Other objects and advantages will be apparent in the detailed description of the invention hereinafter set forth.

In the pasteurization of milk the primary object is the destruction of pathogenic bacteria. Since the germs of bovine tuberculosis are the most resistant to heat of those more commonly found in milk, the thermal death points of these germs have been selected as defining the limits of commercial pasteurization.

Temperature and time are both factors in germ destruction. There is a definite relationship within a considerable range between temperature and time in the determination of the thermal death points of germs in milk.

Health authorities have selected 142° F. as the minimum temperature and 30 minutes as the minimum time period to define the process of pasteurization. This treatment ensures the destruction of bovine tubercle bacilli and of all other pathogenic bacteria carried by milk which are less resistant to heat. This process of pasteurization also kills the majority of non-pathogenic germs found in milk commonly originating from dust and dirt and unclean utensils.

Successful pasteurization must give consideration to the effects of heat on the milk itself. Too much heat causes serious chemical and physical changes, and causes serious damage to the commercial value of the product by impairing the creaming properties of milk. If too much heat is applied to the milk, the albumen and casein are partially coagulated and the butter fat globules expanded to the extent of bursting into smaller globules. Consequently, surface friction is increased and the fat globules do not rise as rapidly, and the overheated milk shows a smaller volume of cream in the upper portion of the commercial milk bottle than milk not overheated.

The temperature at which these physical changes begin to take place is 145° F. for 30 minutes. This is only 3° above the required limit for pasteurization. Therefore, to properly pasteurize it is required to keep the temperature above 142° F., and to prevent milk injury it is necessary to heat below 145° F. The operators of pasteurizers have a range of less than 3° for performing the process of pasteurization with best results.

Experience in the study of temperature records and the results of laboratory tests for bacteria in milk samples have shown that, while much destruction takes place at 142° F. for 30 minutes, the efficiency of destruction is greatly increased by the use of temperatures in excess of 142° F. but below 145° F. The last half degree (from 144° F. to 144½° F.) is a critical temperature at which the maximum destruction can be accomplished. All this is without impairing the creaming properties of milk, because the temperatures are below 145° F. for 30 minutes.

The above considerations then make it obvious that under present standards the most effective pasteurizing process is one which is operated at 144½° F. for 30 minutes. This produces maximum bacterial destruction without impairing creaming properties. But, pasteurization at such precisely maintained temperature as this cannot be performed by any commercial apparatus heretofore produced. It requires precision in the control of temperature and time far more accurate than the variable fluctuations common to the types of pasteurizers and temperature controllers in common use.

The instruments used for temperature control throw the heat on and off and heat too much and too little. Inspection of recording thermometer charts always shows irregularities of 3 degrees in the best factories, and of much more than that in poorly operated plants. These variations are, of course, reflected in the product, which varies in the volume of cream appearing in the glass bottles in which milk is delivered to consumers, and in the bacteria count determined by laboratory test.

The present commonly used types of milk heaters employ hot water as the heating medium, the hot water being circulated about the containers or conduits carrying the milk. Heat is supplied to the water directly by injection of steam thereinto from a jet device located in the heater or in an adjacent supply pipe leading thereto. Intermittent operation of the jet is controlled by the raising and lowering of the milk temperature. This action subjects the milk to the maximum variations in temperature caused by the intermittent operation of the steam jets in water adjacent to the milk.

No sharp line has yet been drawn between efficiency in heat transfer and efficiency in temperature control. These are two distinct problems. Efficiency in heat transference may be improved by enlarging the surfaces in contact with the milk, or by greater velocity in the circulation of the heating water. But efficiency in temperature controls means the reduction of temperature variations to a minimum. It is obvious that temperature variations in the heated milk are primarily due to temperature variations in the heating medium itself. If, therefore, the temperature of the heating medium can be controlled and regulated so that fluctuations do not occur, with a constant heating surface and constant flow of heating medium and of milk, the fluctuations in milk temperature may be eliminated even in a heater that is very inefficient in the transference of heat.

In the heaters now customarily in use, there is not more than 8 square feet of heating surface per thousand pounds of milk per hour. The ratio of heating water to milk where pumps are used is commonly not more than 3 to 1. Temperature differences between the finished milk and the heating water are commonly as high as 30 degrees in some types of apparatus.

In my invention I use two heaters of common type connected in tandem. By the use of two heaters instead of one I double the amount of heating surface heretofore commonly utilized in heating milk to the desired temperature for pasteurization. Since in my arrangement the same milk is pumped through both heaters while each heater has its own independent water supply I also double the amount of heating medium.

There is no serious objection to heat fluctuations in raising the temperature of cold milk for example from 40° F. to 120° F. This preliminary step is only a problem of heat transfer. But as the temperature comes up near that of the pasteurizing standard, temperature control becomes increasingly important. It greatly simplifies the problem of precision in final temperature control to supply milk to the final heating unit which is already heated to 120° F. or more. There remain only 24° or less through which the milk must be raised. The temperature control apparatus is not strained by a large difference between cold milk and heating medium. For this reason the tandem or double heater greatly facilitates temperature control. The first unit of the tandem does the bulk of the heating with only fair control. But the second unit with much less heating work to do is able to control the temperature within limits that justify the term precision.

Two barrel heaters may be connected in tandem. The first barrel unit may be heated with either a direct connected steam jet in its jackets or with a pump supplying hot water. In accordance with my invention, the second unit must be supplied with hot water from a double tank system as disclosed herein, under accurate temperature control. Or a barrel heater may be used as the first unit and a tubular heater as the second unit. Or two tubular heaters may be connected in tandem, the latter arrangement being that which I have selected for illustration herein. Precision heating is accomplished with either of the variable arrangements, provided the first unit raises the temperature of the milk to 120° F. or more, and the second unit is supplied with heating water the temperature of which is first accurately controlled in accordance with my invention. In all of these tandem arrangements under these conditions the heated milk can be kept within a variation of .2° F. at the outlet.

The advantages of my invention, whereby precision heating of milk may be accomplished with temperature control within a range of less than one half of one degree F., arise especially from; (1) the provision of two heating stages in one of which a great temperature change is roughly accomplished, and in the other of which a small temperature change is effected with precise uniformity in final temperature, (2) the provision for precise regulation of the temperature of the heating medium supplied to the final milk heating stage, whereby heat is intermittently applied to a portion of the heating medium and that portion thereafter intermixed with a greater portion of the medium held in supply, the intermixture effecting the smoothing out of temperature variations due to intermittent heat application, and (3) a sufficient heating surface area and volume relation between milk and heating medium to assure an efficient exchange of heat from medium to milk.

A preferred embodiment of the invention is illustrated in the accompanying drawings. It will be understood, however, that various changes in form, construction and arrangement may be made by those skilled in the art without departing from the scope and spirit of the invention as expressed in the appended claims.

Referring to the drawings, Fig. 1 is a diagrammatic representation of a preferred arrangement of apparatus embodying my invention. Fig. 2 is a view in side elevation, sectional in part, of the apparatus in commercial structure. Fig. 3 is a front end elevation of the same apparatus.

In the drawings, the numeral 1 indicates the first one of two like units of conventional tubular milk heater, the second unit being indicated at 2. Each unit comprises a series of milk conducting tubes 3 (see Fig. 1) positioned with annularly spaced enclosing tubes 4, the tubes being endwardly supported in suitable standards 5. The inner tubes and outer tubes respectively are alternately connected at their ends by means of return bends 6, of conventional form, providing continuous passages respectively for milk and heating water progressing through the series of double tubes, milk being conducted through the inner tubes and hot water through the annular spaces between the inner and outer tubes. Such heater construction is well known in the art, and further detailed description thereof is not necessary herein. In my employment of two units of the tubular heaters, I may enclose them in a common insulating casing 7, as shown in Figs. 2 and 3, to prevent loss of heat radiation and improve appearance, the casing being supported upon legs 8.

Milk to be heated for pasteurization is customarily pumped from suitable storage tanks (not shown) at a uniform rate into and through the heater, and thence into suitable containers (not shown) for holding the hot milk during the prescribed period of time. In the arrangement herein illustrated, the milk is brought to the first heater unit through a pipe 9, passing therefrom down through the series of inner tubes 3 and being delivered to the second heater unit through the connecting pipe 10, from whence the milk passes down through the inner tubes of the second unit and is discharged through a pipe 11 leading to the holding containers.

For indication of temperatures at critical points in the milk passage and in the heating medium circulation conduits, thermometers may be placed therein as indicated in Fig. 1 at 12 and 13 in the respective hot water inlet connections to the first and second heater units, and at 14 and 15 in the respective milk outlet passages from the first and second heater units. In the commercial form of structure shown in Figs. 2 and 3, suitable fittings of well known type may be introduced into the milk and water connections at the points indicated in Fig. 1 for the attachment of any desired type of thermometer.

A source of motive power, preferably an electric motor 16, drives a pair of rotary pumps 17 and 18 for circulating the heating water through the two heater units. The pump 17 discharges into a pipe 19 leading to the water inlet of the first heater unit, and the pump 18 discharges into a pipe 20 leading to the water inlet of the second heater unit. Having passed through the first heater unit 1, the water flows through a return pipe 21 into a water heating tank 22. The circuit for heating water through unit 1 is completed by a pipe 23 leading from tank 22 to the suction inlet of the pump 17. The heating water pumped through heater unit 2 flows therefrom through a return pipe 24 leading into another water heating tank 25. From the tank 25 the water flows through a connection 26 into a relatively large temperature smoothing reservoir or mixing tank 27, from which the heating water circuit for unit 2 is completed by a pipe 28 leading to the suction inlet of the pump 18.

Provision is made for filling the two independent heater water circuits with water from a source of supply by means of pipes 29 and 30 respectively connected into the pump suction lines 23 and 28 through hand control valves 31 and 32. Overflow from the two circuits may occur, resulting from the accumulation of condensation from the steam heaters hereinafter described, through the overflow pipes 33 and 34 respectively opening into the tanks 22 and 25.

Heat is introduced into the heating water of the two circuits preferably by the injection of live steam which is accomplished within the two water heating tanks 22 and 25. Any suitable type of steam injector may be employed, one of which is indicated in each tank 22 and 25 at 35 and 36 respectively. The injectors 35 and 36 are respectively connected through the walls of the tanks with steam supply pipes 37 and 38. The latter are controlled respectively by regulating valves 39 and 40 having automatic thermo control as hereinafter described. For expediting initial heating of the water to operating temperatures, by-pass connections 41 and 42 are provided around the respective regulating valves 39 and 40, the by-passes being controlled by hand valves 43 and 44.

In the formal structure illustrated in Figs. 2 and 3, the mixing tank 27 is supported upon suitable legs 45, and the heating tanks 22 and 25 are supported upon the tank 27 by means of the pipe connection 26 and the closed pipe standards 46. For the conservation of heat in the several tanks, the assembly may be covered by insulation, as indicated at 47, with preferably a sheet metal jacket overlying the insulation.

The steam regulating valves 39 and 40 may be any of several well known types, those herein illustrated being of the electro-magnetically actuated type having electric connections through conductors 48 and 49 (see Fig. 1) with automatic thermo-controlled electric switching devices 50 and 51 independently effective to actuate the respective regulating valves. The devices 50 and 51 include thermometers of which the connections 52 and 53 respectively lead to fluid expansion bulbs 54 and 55 positioned in water heating tanks 22 and 25, and are respectively provided with means for setting a predetermined temperature for the water in the respective tanks 22 and 25, above which the devices are independently automatically operable to close the respective regulating valves 39 and 40, and below which the valves are opened for the admission of steam to the respective heating tanks. The devices 50 and 51 may be any of several types of automatic temperature controls well known in the art. As illustrated in Figs. 2 and 3, the control devices are mounted on a panel board 56 supported on frame members 57 mounted on the legs 45.

In operation, the temperature controls 50 and 51 are set at any desired temperatures. From numerous experimental tests I have found that a desirable choice of temperatures is to set the controller for the steam valve 39 at 130° F. and the controller for the steam valve 40 at 145° F. With the motor 16 in operation, the pumps 17 and 18 drive water through the tubular heater units 1 and 2. The thermometers 12 and 13 show the temperatures of the water from the pumps to both heater units. With the water heated to operating temperatures, the valves 39 and 40 operate intermittently to admit and cut off steam to the tanks 22 and 25. When either valve is open it remains open until the steam heats the water in its respective tank above the temperature at which the controller is set. By going above this point the controller receives the impulse which closes the steam valve. The steam valve then remains closed until the temperature of the water in the tank is reduced below the point at which the controller is set. This reduction results from the return of the heating water from the heater unit, where it has given up a portion of its heat to the cold milk. When the temperature in the tank has been carried far enough below the point at which the controller is set, it receives the impulse which causes it to open the steam valves, and steam is again injected into the water. This intermittent action of steam valves 39 and 40 is very frequent, occurring for example twice a minute. The range or swing of temperature necessary to cause the controllers to act, is from 1° to 2° above and below the temperatures at which they are set. Consequently the water in tanks 22 and 25 is alternately hotter and colder than required.

The thermometer at 12, which shows the temperature of the water from tank 22 and pump 17, will be observed to continually fluctuate from 2° to 4° with an average variation of at least 3°. As a consequence of the variations in water temperature, the milk which is heated in heater unit 1 shows similar fluctuations in temperature, as observed in thermometer 14 at the milk outlet. The variations in milk temperature are not quite so large as the water variations, but they range from 1° to 3° with an average of at least 2°.

Tank 22 and heater unit 1 correctly represent the commercial milk heaters formerly in use. The variations in water temperature of the water from tank 22 at thermometer 12 averaging 3° F., and of milk temperature at thermometer 14 averaging 2° F., correctly represent the variations in water and milk temperatures in former milk heaters of good type. Tank 22 and heater unit 1 with steam controller 50, and the temperature variations which are unavoidable from the intermittent action of steam valve 39, correctly represent the present state of the art of milk heating.

The milk from heater unit 1 is next carried to the second heater unit 2. Unit 2 is supplied with hot water tanks 25 and 27. The combination of tanks 25 and 27 constitute a novel system of hot water supply. The capacity of tank 25 is for example 30 gallons. The capacity of tank 27 is 180 gallons or 6 times the capacity of tank 25. The water from tank 25 flows by gravity and by pressure through outlet 26 into tank 27. The pipe 26 conveying water from tank 25 to tank 27 is discharged close to one end of tank 27. The supply pipe 28 for pump 18 is so located that its outlet from tank 27 is at the opposite end of tank 27 from the inlet 26. Consequently the water discharged from tank 25 has to travel the entire length of tank 27 to reach pump 18. In this way the water discharged from tank 25 is thoroughly mixed with the entire contents of tank 27.

The temperature of the water discharged from tank 25 fluctuates from 2° to 4° and has an average fluctuation of 3° from the same causes previously described in connection with tank 22. The relations of controller and steam valve in the case of tank 25 are identical with those described for tank 22. Consequently, tank 25 is constantly discharging water into tank 27 which alternately fluctuates above and below the temperature at which its controller is set. By numerous experiments I have determined that a mixture within tank 27 of six complete discharges from tank 25 results in smoothing out the initial temperature variations to the extent that the temperature of the intermixed body of water in tank 27 is practically that uniformly desired, and that continued operation results in maintaining constant temperature in tank 27 at the desired degree for which the controller is set. It is obvious that a thorough mixture of equal parts of water that is 2° F. above the desired temperature with water 2° F. below the desired temperature should produce water at about the desired temperature.

In practice this is what actually occurs. A sensitive thermometer at 13, which is the hot water inlet to heater unit 2 coming from tank 27, shows in numerous experimental texts a maximum variation of only .4 of a degree Fahrenheit and an average variation of only .2° Fahrenheit. By the use of mixing tank 27, the temperature variations of tank 25 are practically eliminated.

This precise control of water temperature furnishing heat to heater unit 2 results in a perfect and precise control of the temperature of the milk passing through this second stage heater. Thermometer 15 shows the temperature of the milk at the outlet of the second heater unit, which is the finished product of the entire process. Numerous experimental observations of this thermometer have shown that the temperature of the milk at this outlet under the conditions named has a maximum variation of .2° Fahrenheit and an average variation of .1° Fahrenheit. This is as close precision as can be read with the best type of thermometers.

By this apparatus the fluctuations in heating water supply of commercial milk heaters is reduced from 4° Fahrenheit to .4° Fahrenheit and of milk at the outlet from 3° Fahrenheit to .2° Fahrenheit.

The milk may come to the first heater unit from a cold storage tank with a temperature of 40° F. or less. With the control 50 for tank 22 set at 130° F., and pump 17 pumping water at a rate 3 times that of the milk passing through heater unit 1, the latter will raise the temperature of the milk from 40° F. to 124° F. or within 6° F. of the average water temperature.

With milk entering heater unit 2 at 124° F., and control 51 for tank 25 set at 145°, and pump 18 operating at 3 times the rate of flow of the milk, unit 2 will raise the temperature of the milk from 124° F. to 144.5° F. or within .5° F. of the water temperature. Thus the first heater unit raises the milk temperature 84° F. while the second heater unit raises it only 20.5° F. The object of dividing the work between the two heater units is to separate the work of mere temperature raising from the work of precision temperature regulation. The task of temperature regulation within precision limits is much easier where the range through which the milk must be lifted is small than where it is large. A large range such as a lift of 100° F. or more subjects the controlling devices to a much greater strain than a small range or lift of only 20° F. My tests with the same controlling devices have repeatedly shown a direct relation between the extent of the range and extent of variations. With large range, variations are great. With small range, variations are small.

In this process there is a novel system of temperature regulation. The ordinary temperature control devices receive their impulses from the expansion and contraction of liquids or gases such as mercury, ether, etc., which are contained in the bulbs and tubing included in such devices. The common practice heretofore has been to attach the bulbs of these expansion lines to milk tanks or milk pipes so that they are effected by the temperature changes in the milk itself. Much more precise control can be accomplished by inserting these bulbs in the water itself. By placing the bulbs in the water, the temperature changes in the water act directly on the regulators and cause them to provide more steam or less steam as may be required to keep the water temperature uniform. Instead of changing the water temperature to compensate for changes in milk temperature, which is what occurs when the control bulbs are in the milk, better results are attained by keeping the water temperatures as uniform and unchanged as possible, ignoring entirely any temperature differences in the milk. By placing the bulbs of the control devices in the water of both of my small water heating tanks, the temperatures of the waters in these tanks are kept close to the points at which I set the indicators on the temperature scale. It is such regulation of water temperature that makes precision heating possible.

With fixed water temperatures, fixed pumping rate of water to heaters, a fixed volume ratio of milk to water, sufficient heating surface, precision heating is guaranteed. For example, with the temperature of the water supply of the first heater unit set at 130° F. and of the second heater unit set at 145° F., and a combined volume ratio of milk one to water six, and with 16 square feet of heating surface to 1000 lbs. of milk per hour, under the conditions named, precision heating within two tenths of a degree F. is guaranteed. Of course, the rated capacity of the equipment must not be exceeded. An excess of milk will obviously upset the ratio and reduce the relative amount of heating surface. In no event can milk be heated hotter than the water. Any capacity less than the rated capacity of the equipment can be taken care of by this arrangement. If for example the rated capacity of the equipment for heating milk is 6000 lbs. per hour and with the temperatures of the two water supplies set at 130° F. and 145° F., and a volume flow ratio of milk 1 to water 6, the temperature of the milk at the final outlet is 144.5° F. If then the flow of milk is reduced to one half the capacity, or 3000 lbs. per hour, the apparatus quickly adjusts itself and will control the temperature with the same precision but with an increase of temperature at the outlet of a fraction of a degree, so that this smaller flow of milk will have an outlet temperature slightly above 144.5° F. The equipment provides so much excess of heating surface and so much excess of heating water over and above the heaters commonly in use that it can take care of all variations in rates of flow of milk from maximum capacity to zero with a range of not more than one degree at the outlet. Within this range the variation will be not more than two tenths of one degree for any constant rate of flow.

It will be obvious, of course, that, while I have hereinbefore described the apparatus as a heater for progressively raising the temperature of milk passing through the successive units, a change in the setting of the controls 50 and 51 would enable raising the milk temperature to a relatively high degree in the first unit, and then substantially lowering that temperature in the second unit to a final degree at which the heating is finished with the precision results above described. Also, in any circumstances in which precision cooling were desirable, the apparatus could be adapted so to do by substituting cold water similarly controlled for the hot water circulation above described. It will be understood that in the above description and in the following claims reference to heating medium and medium heating means applies equally to cooling medium and cooling means.

It will further be understood that my invention is not limited to the use of the specific forms of tanks utilized for heating and mixing purposes in the herein disclosed preferred embodiment of the invention. Other forms of tanks or chambers may be utilized, if desired, and the heating chambers may be constituted by enlarged, elongated, or any other portions of, or spaces included within, the piping which is ordinarily used to constitute the flow circuit for the heating or cooling medium. The mixing chambers may be constituted by any construction providing a substantial enlargement over the ordinarily used piping and steam jets or other connections in the circuit of the heating or cooling medium between the heating or cooling means therefor and the heat transfer portion of the circuit, whereby the desired mixing function may be accomplished.

I claim as my invention:

1. Milk heating apparatus comprising, a plurality of heater units each unit having a milk passage and a heating fluid passage arranged in heat exchange relation, said milk passages being interconnected for a continuous flow of milk therethrough, a source of supply of heating fluid for each of said units having connection with said fluid passages respectively, and means associated with each of said sources of supply of heating fluid for independently regulating the temperature thereof.

2. Milk heating apparatus comprising a heater having a continuous passage for the flow of milk and a plurality of independent passages for the flow of heating fluid in heat exchange relation to said milk, means for independently supplying heating fluid to each of said fluid passages, and means for independently controlling the temperature of the fluid supplied to each of said fluid passages.

3. Milk heating apparatus comprising a pair of heater units having a continuous milk passage through both units and having a heat exchange fluid passage in each unit independent of the other unit, means for supplying heating fluid to one of said units at a temperature effective to cause a relatively large increase of temperature in the milk passing through said unit, means for supplying heating fluid to the other of said units at a temperature effective to cause a relatively small increase of temperature in the milk passing through said other unit and means for regulating the temperatures of the heating fluid supplied to each of said fluid passages.

4. Milk heating apparatus comprising a heater having a continuous milk passage and a pair of separate passages for heat exchange fluid in successive heat exchange relation to said milk passage, means for independently supplying heat exchange fluid to said fluid passages respectively, heat input means for maintaining an approximately constant temperature in the heat exchange fluid supplied to the first of said fluid passages, and heat varying means effective to maintain a precisely constant temperature in the heat exchange fluid supplied to the second of said fluid passages.

5. Milk heating apparatus comprising a heater having a continuous milk passage and a pair of separate passages for heating water in successive heat exchange relation to said milk passage, a heating chamber included in the first of said water passages, a second heating chamber and a mixing chamber included in the second of said water passages, connections establishing a circuit for the flow of heating water from said second heating chamber to said mixing chamber, thence through said second water passage and thence returning to said second heating chamber, means for heating the water in said heating chambers, and means for circulating the water in said circuits.

6. Milk heating apparatus comprising a pair of heater units, each unit having a milk passage and a water passage arranged in heat exchange relation, said milk passages being connected for the continuous flow of milk therethrough, a water heating chamber, connections for the circulation of water between said chamber and the water passage in one of said heater units, a second water heating chamber having a return connection from the water passage in the other of said units, a mixing chamber having a supply connection to the water passage in said other unit and having a return connection from said second water heating chamber, means for heating the water flowing through said water heating chambers, and means for independently controlling the heat input to each of said water heating chambers.

7. In milk heating apparatus, a milk passage, a water passage, said passages being arranged for heat exchange, a water heating tank, a mixing tank, connections forming a circuit for the flow of water from said mixing tank through said water passage to said heating tank and return to said mixing tank, and means for heating the water flowing through said heating tank.

8. In milk heating apparatus, a milk passage, a water passage, said passages being arranged for exchange of heat therebetween, a water heating tank, a mixing tank, connections for the circulation of water from said mixing tank to said passage and said heating tank and return to said mixing tank, intermittently operable heat input means for heating the water in said heating tank, and temperature controlled means for actuating said heat input means tending to maintain a constant temperature in said heating water.

9. Apparatus for maintaining a supply of water at substantially constant temperature in a heat exchange circuit comprising a heating tank adapted to receive water from said circuit, a mixing tank adapted to deliver water to said circuit, a connection between said heating tank and said mixing tank, heat input means associated with said heating tank, and controlling means for said heat input means responsive to variations from a predetermined degree in the water flowing through said heating tank.

10. Apparatus for maintaining a supply of water at substantially constant temperature in a heat exchange circuit comprising a heating chamber adapted to receive water from said circuit, a mixing chamber adapted to deliver water to said circuit, and having a volumetric capacity greater than that of said heating chamber, a connection between said heating chamber and said mixing chamber, valve means controlling an intermittent discharge of heating fluid into said heating chamber, and actuating means for said valve means responsive to temperature variations in the water flowing through said circuit whereby heating fluid is discharged into said heating chamber when said temperature is below a predetermined degree and cuts off said discharge when said temperature rises above said predetermined degree, said mixing functioning to intermix the water of said low and high degree before entering said heat exchange circuit.

11. A multiple stage liquid heating apparatus comprising a preliminary and a final heater through which the liquid passes in succession, means for circulating a separate heating medium through each heater in heat exchange relation with the liquid therein, temperature regulating means for the preliminary heater which causes the liquid to leave the preliminary heater at a temperature below the final required temperature of the liquid, and temperature regulating means for the final heater which operates to prevent the maximum temperature of the heating medium entering the final heater from substantially exceeding the final required temperature of the heated liquid.

12. In milk heating apparatus, a milk passage, a water passage, said passages being arranged for heat exchange, a water heating device, a mixing chamber, connections forming a circuit for the flow of water from said mixing chamber through said water passage to said heating device and return to said mixing chamber, and means for supplying heat to said heating device, said mixing chamber being of substantially larger proportions than the water connections between said heating device and said water passage.

13. In milk heating apparatus, a milk passage, a water passage, said passages being arranged for exchange of heat therebetween, a water heating device, a mixing chamber, connections for the circulation of water from said mixing chamber to said passage and said heating device and return to said mixing chamber, intermittently operable heat input means for heating the water in said heating device, and temperature controlled means for actuating said heat input means tending to maintain a constant temperature in said heating water, said mixing chamber being of substantially larger proportions than the water connections between said heating device and said water passage.

14. Apparatus for maintaining a supply of water at substantially constant temperature in a heat exchange circuit comprising a heating chamber adapted to receive water from said circuit, a mixing chamber adapted to deliver water to said circuit, a connection between said heating chamber and said mixing chamber, heat input means associated with said heating chamber, and controlling means for said heat input means responsive to variations from a predetermined degree in the water flowing through said heating chamber, said mixing chamber being of substantially greater proportions than the water connections between said heating chamber and said heat exchange circuit.

15. Apparatus for maintaining a supply of water at substantially constant temperature in a heat exchange circuit comprising a heating chamber adapted to receive water from said circuit, a mixing chamber adapted to deliver water to said circuit, a connection between said heating chamber and said mixing chamber, heat input means associated with said heating chamber, and controlling means for said heat input means responsive to variations from a predetermined degree in the water flowing through said circuit, said mixing chamber being of substantially greater proportions than the water connections between said heating chamber and said heat exchange circuit.

16. Milk heating apparatus comprising a plurality of heat controlling units, each unit having a milk passage and a heat exchange fluid passage arranged in heat exchange relation, said milk passages being interconnected for a continuous flow of milk therethrough, an independent source of supply of heat exchange fluid for each of said units having connection with said fluid passages respectively, and means associated with each of said sources of supply of heat exchange fluid for independently and automatically regulating the temperature thereof.

17. Milk heating apparatus comprising a heater having a continuous passage for the flow of milk and a plurality of independent passages for the flow of heat exchange fluid in heat exchange relation to said milk, means for independently supplying heat exchange fluid to each of said fluid passages, and automatic means for independently controlling the temperature of the fluid supplied to each of said fluid passages.

18. Milk heating apparatus comprising a pair of heat controlling units having a continuous milk passage through both units and having a heat exchange fluid passage in each unit independent of the other unit, means for supplying heat exchange fluid to one of said units at a temperature effective to cause a relatively large increase of temperature in the milk passing through said unit, means for supplying a separate heat exchange fluid to the other of said units at a temperature effective to cause a relatively small change of temperature in the milk passing through said other unit and automatic means for independently regulating the temperature of the heat exchange fluid supplied to each of said fluid passages.

In witness whereof, I have hereunto attached my signature.

CHARLES E. NORTH.

CERTIFICATE OF CORRECTION.

Patent No. 1,796,577.  Granted March 17, 1931, to

CHARLES E. NORTH.

It is hereby certified that error appears in the printed specification of the above numbered patent requiring correction as follows: Page 3, line 106, strike out the word "the" first occurrence; page 7, line 91, claim 10, before "functioning" insert the word chamber; page 8, line 77, claim 18, for "temperature" read temperatures; and that the said Letters Patent should be read with these corrections therein that the same may conform to the record of the case in the Patent Office.

Signed and sealed this 28th day of April, A. D. 1931.

(Seal)

M. J. Moore,
Acting Commissioner of Patents.